Aug. 21, 1962 C. R. WORKMAN 3,049,801
METHOD OF ASSEMBLING FLEXIBLE INSULATORS ON BUS BARS
Filed Jan. 16, 1961
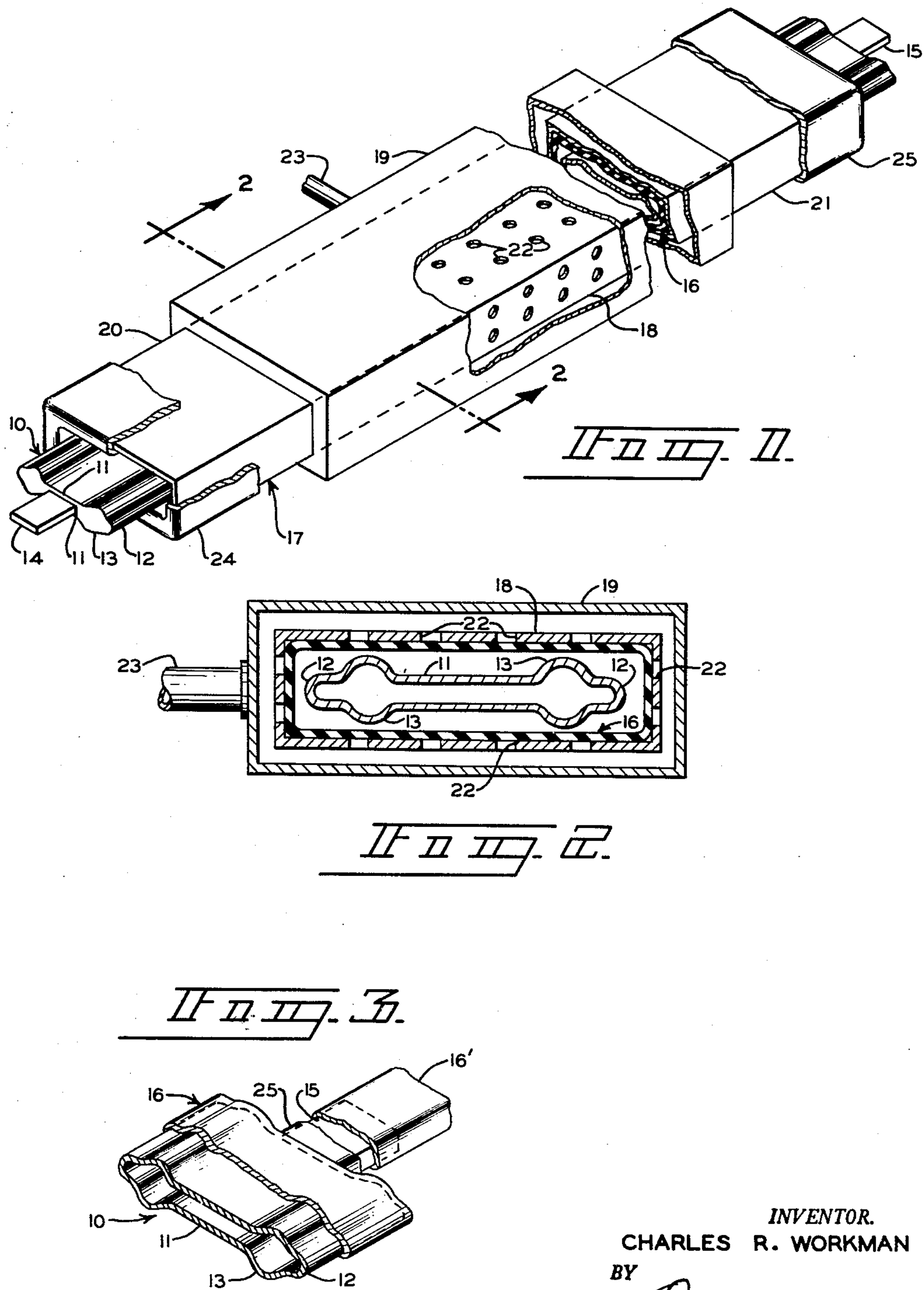
INVENTOR.
CHARLES R. WORKMAN
BY
Owen & Owen
ATTORNEYS

United States Patent Office 3,049,801 Patented Aug. 21, 1962

3,049,801
METHOD OF ASSEMBLING FLEXIBLE INSULATORS ON BUS BARS

Charles R. Workman, Findlay, Ohio, assignor to Cooper Tire and Rubber Company, Findlay, Ohio, a corporation of Delaware Filed Jan. 16, 1961, Ser. No. 83,049
3 Claims. (Cl. 29—450)

The present invention is concerned with a method of insulating electrical conductors, and more particularly to an improved method of assembling an open ended, tubular insulator of air impervious, stretchable material onto the outer surface of a bus bar having an irregular configuration.

Electrical conductors are customarily insulated by wrapping strips or layers of insulating material around the conductors to cover their surfaces. This process is both time consuming in the case of bus bars having a uniform cross section and impractical where the bus bars have irregular configurations. It is especially difficult to properly insulate a bus bar where there are protrusions in the outer surface of the bar because the insulating material may not contact the surface of the bar adjacent the protrusions, and this enables the insulating material to be torn or punctured at the unsupported areas.

In an attempt to solve the above problem, it has been proposed to cover the bus bar with a tubular insulator of stretchable material which is either drawn or rolled over the bus bar. Both of these methods are likewise time consuming because friction between the surfaces of the bus bar and the insulator makes sliding the insulator over the bar difficult, and rolling this material over the bar necessitates a prior rolling of the insulator. These procedures become even less desirable as the length of the conductor to be insulated increases.

It is, therefore, the object of the present invention to provide an improved method of insulating an electrical conductor.

A further object of the invention is to provide an improved method of assembling a tubular insulator of stretchable material on a bus bar having an irregular configuration.

A still further object of the invention is to provide an improved method of quickly insulating relatively long bus bars.

Other objects and advantages of the invention will be apparent from the following specification and drawings in which like numbers are used throughout to identify like parts.

In the drawings:

FIG. 1 is a perspective view with parts broken away of an apparatus which may be used to perform the method of the invention;

FIG. 2 is a vertical sectional view taken along the line 2—2 of FIG. 1; and

FIG. 3 is an enlarged fragmentary view in perspective of an end of a bus bar having an insulator assembled thereon prior to being removed from the apparatus shown in FIG. 1.

Referring now to the drawings, there is shown a hollow bus bar 10 that is to be insulated according to the method and apparatus of the invention. Bus bars of this type are usually about ten feet long which makes conventional methods of insulating by wrapping excessively time consuming.

As shown in FIGS. 1 to 3, the bus bar 10 has a generally uniform portion indicated at 11 that is located between opposed longitudinal edges 12 of the bar 10. The central portion 11 has spaced, realtively flat outer surfaces and the edges 12 are curved. Outwardly directed protrusions 13 having rounded configurations extend the entire length of the bus bar 10, and a pair of these parallel protrusions are located on each side of the bus bar 10 between the central portion 11 and the rounded edges 12.

As shown in FIGS. 1 and 3, the opposed ends of the hollow bus bar 10 are closed, and a lug 14 protrudes from one end of the bus bar along the axis thereof. A similar lug 15 protrudes from the opposite end of the bus bar 10 as shown in FIG. 1. In the case where the bus bar 10 is approximately ten feet long the lugs 14 and 15 are preferably about one foot long. However, in the case of shorter bus bars, the lugs are proportionately shorter.

An insulator 16 in the form of a tubular sleeve having opposed open ends is mounted upon the bus bar 10 to insulate the same. The insulator 16 is of a stretchable material, such as butyl rubber, to insure intimate contact between the outer surface of the bus bar 10 and the insulator 16, especially in the centrally disposed portion 11 between the protrusions 13. It is apparent that because the bus bar 10 is relatively long, it would be rather difficult to draw or stretch the insulator 16 thereover. Also, it would be impractical to roll a tubular insulator 16 of this length.

According to the present invention, an elongated, rigid enclosure 17 is utilized to load the insulator 16 onto the bus bar 10. The enclosure 17 has a central section indicated at 18 that is contained in an airtight housing 19. An end section 20 of the enclosure 17 extends from an end of the housing 19 while a similar end section 21 extends from the opposite end of the housing 19.

As shown in FIGS. 1 and 2, a plurality of apertures 22 are formed in the central portion 18 of the enclosure 17, but the walls of the end portions 20 and 21 are imperforate. An airtight seal is formed between the end sections 20 and 21 and the end walls of the housing 19.

A line 23 that is in communication with the interior of the housing 19 is connected to a suitable means, such as a vacuum pump, for evacuating the interior of the housing 19. As the housing 19 is evacuated through the line 23, the interior of the enclosure 17 will likewise be avacuated through the apertures 22 when the outermost ends of the end portions 20 and 21 which are in open communication with the central portion 19 are closed.

According to the method of the invention, the open ended, tubular insulator 16 that is slightly longer than the bus bar 10 is inserted through the enclosure 17 until both of its ends extend from the end sections 20 and 21. The manner in which the insulator 16 is inserted in the enclosure 17 will be described later in detail.

An end portion 24 of the insulator 16 is cuffed back over the end portion 20 and an opposed end portion 25 is cuffed back over the end section 21 as shown in FIG. 1. The insulator 16 is sufficiently stretched at the cuffed end portions 24 and 25 to form an airtight seal between the insulator 16 and the enclosure 17 to seal the exterior of the insulator 16 from ambient pressure.

Air in the housing 19 is then evacuated through the line 23 which likewise removes air from the space between the insulator 16 and the interior surfaces of the enclosure 17. The stretchable insulator 16 is expanded into contact with the inner surface of the enclosure 17 as shown in FIG. 2 because of the pressure differential between the inside and outside of the insulator 16.

The cross sectional size of the insulator 16 in its unstretched condition is substantially less than the cross sectional size of the bus bar 10. However, when the insulator 16 is stretched into engagement with the inner surface of the enclosure 17 the cross sectional size is greater than that of the bus bar 10. When the insulator 16 is so expanded, the bus bar 10 is inserted through both the insulator 16 and the housing 17 until its ends protrude slightly from the end sections 20 and 21, as shown in FIG. 1.

After the bus bar 10 has been inserted through the insulator 16, the end portions 24 and 25 of the insulator 16 are unrolled from the end sections 20 and 21 of the enclosure 17. This breaks the airtight seal between the insulator 16 and the enclosure 17, and the insulator 16 contracts onto the peripheral surface of the bus bar 10.

As shown in FIG. 3, the end of a second insulator 16' is fitted over the lug 15 on the end of the bus bar 10 before the bus bar 10 is removed from the enclosure 17. The bus bar 10 is then moved out of the enclosure 17 in a direction away from the second insulator 16' to pull the second insulator 16' into and through the enclosure 17 as the first bus bar 10 is pulled out. The second insulator 16' is then disconnected from the lug 15 and its two end portions are cuffed over the end sections 20 and 21 of the enclosure 17 in the manner previously described.

After the insulator 16 has contracted on the bus bar 10 as shown in FIG. 3, a portion of each end of the insulator 16 engages the lugs 14 and 15 because, as stated earlier, the insulator 16 is slightly longer than the bus bar 10. This excess insulating material is removed from the lugs 14 and 15 after the insulator 16' has been pulled through the enclosure 17.

While the preferred embodiment of the invention has been shown and described, other modifications may be made to the method and apparatus without departing from the scope of the appended claims.

I claim:

1. A method of assembling a stretchable insulator on a relatively long bus bar in an enclosure; said method comprising the steps of expanding the insulator into contact with the inner walls of the enclosure, inserting a bus bar through the insulator and enclosure, contracting the insulator into contact with the bus bar, attaching one end of another insulator to one end of the bus bar, and moving the bus bar through the enclosure in a direction away from the end having the second insulator attached thereto to move the second insulator into the enclosure.

2. A method of assembling a tubular insulator of stretchable material on a relatively long bus bar in an enclosure; said method comprising the steps of establishing a pressure differential between the interior and exterior of the insulator to expand the insulator to a cross sectional size larger than that of said bus bar and into contact with the inner walls of the enclosure, inserting a bus bar through the insulator and enclosure to a position wherein the ends of the bus bar protrude from the ends of the insulator, removing the pressure differential to contract the insulator into contact with the bus bar, attaching one end of another insulator to one end of the bus bar, moving the bus bar through the enclosure in a direction away from the end having the second insulator attached thereto to move the second insulator into the enclosure, and removing the end of the second insulator from the bus bar when said end of said second insulator protrudes from the enclosure.

3. A method of assembling a tubular insulator of stretchable material having a pair of open ends on a relatively long bus bar having an irregularly shaped cross section in an enclosure having opposed open ends; said method comprising the steps of securing the pair of open ends of the insulator to the opposed ends of the chamber to form an airtight seal, evacuating the chamber to expand the insulator to a cross sectional size larger than that of said bus bar and into contact with the inner walls of the enclosure while maintaining the ends of the insulator sealed to the enclosure, inserting a bus bar through the insulator and enclosure to a position wherein the ends of the bus bar protrude from the ends of the insulator, removing at least one end of the insulator from the enclosure to destroy the airtight seal and contract the insulator into contact with the bus bar, attaching one open end of second insulator to one end of the bus bar, and moving the bus bar through the enclosure in a direction away from the end having the second insulator attached thereto to move the second insulator into the enclosure, and removing the end of the second insulator from the bus bar when said end of said second insulator protrudes from the enclosure.

References Cited in the file of this patent

UNITED STATES PATENTS 2,975,512 Somes ---------------- Mar. 21, 1961

OTHER REFERENCES

"Expansion Vacuum Tool" (Pederson et al.), IBM Tech. Disclosure Bulletin, vol. 1, No. 2, August 1958.